US007580951B2

(12) United States Patent
Blair-Stanek

(10) Patent No.: US 7,580,951 B2
(45) Date of Patent: Aug. 25, 2009

(54) USER-LOCALIZABLE HIERARCHICAL LISTS

(75) Inventor: Andrew Blair-Stanek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 10/941,310

(22) Filed: Sep. 15, 2004

(65) Prior Publication Data

US 2006/0080358 A1    Apr. 13, 2006

(51) Int. Cl.
*G06F 7/00* (2006.01)
*G06F 17/30* (2006.01)
*G06F 12/00* (2006.01)

(52) U.S. Cl. .................. 707/104.1; 707/204; 707/205
(58) Field of Classification Search .............. 707/104.1, 707/1–206; 704/2, 8
See application file for complete search history.

(56) References Cited

U.S. PATENT DOCUMENTS

| 5,701,137 | A | * | 12/1997 | Kiernan et al. ............... 715/853 |
| 5,778,356 | A | * | 7/1998 | Heiny ............................. 707/2 |
| 6,230,168 | B1 | * | 5/2001 | Unger et al. ................. 715/206 |
| 6,349,275 | B1 | * | 2/2002 | Schumacher et al. ........... 704/8 |
| 6,928,438 | B2 | * | 8/2005 | Daray et al. .................... 707/7 |
| 7,409,410 | B2 | * | 8/2008 | Potter ....................... 707/104.1 |
| 2002/0091745 | A1 | * | 7/2002 | Ramamurthy et al. ....... 709/100 |
| 2002/0143523 | A1 | * | 10/2002 | Balaji et al. .................... 704/8 |
| 2003/0009323 | A1 | * | 1/2003 | Adeli ............................. 704/8 |
| 2003/0084401 | A1 | * | 5/2003 | Abel et al. ................. 715/501.1 |
| 2003/0177135 | A1 | * | 9/2003 | Lechowicz et al. .......... 707/100 |
| 2005/0097440 | A1 | * | 5/2005 | Lusk et al. ................ 715/500.1 |
| 2005/0240393 | A1 | * | 10/2005 | Glosson ........................ 704/8 |

* cited by examiner

*Primary Examiner*—Mohammad Ali
*Assistant Examiner*—Angelica Ruiz
(74) *Attorney, Agent, or Firm*—Merchant & Gould

(57) ABSTRACT

The present invention provides a method and system for user-localizable hierarchical lists. Users can create different representations for values displayed within the hierarchical list. For example, users may localize the list into multiple languages themselves without having to request the change to the vendor supplying the software. In this way, German users can see their skills listed in German, while Spanish users can see their skills listed in Spanish, and so on.

17 Claims, 5 Drawing Sheets

300

*Structure*

| UID | Parent UID |
|---|---|
| 1 | - |
| 2 | 1 |
| 3 | 1 |
| 4 | - |
| 5 | 4 |
| 6 | - |

310

*User Localized Values*

| UID | Value | Language |
|---|---|---|
| 1 | England | en |
| 2 | London | en |
| 3 | Birmingham | en |
| 4 | Germany | en |
| 5 | Berlin | en |
| 6 | France | en |
| 1 | L'Angleterre | fr |
| 2 | Londres | fr |
| 3 | Birmingham | fr |
| 4 | L'Allemagne | fr |
| 5 | Berlin | fr |
| 6 | La France | fr |

USER-LOCALIZABLE HIERARCHICAL LISTS

BACKGROUND OF THE INVENTION

Hierarchical lists allow data to be classified and displayed to a user in a hierarchical fashion. Generally, hierarchical lists classify data into types and subtypes in a tree-like fashion. Each type of data may have one or more subtypes listed below it. Similarly, each subtype may include one or more subtypes, recursively. Hierarchical lists are ideal for representing data that is naturally hierarchical. One such type of data is location data. For example, location data may be structured by continent followed by country and followed by city. Other location levels may also be introduced. For instance, neighborhoods may be listed under a City heading. Once the list is created, however, it is difficult to use these hierarchical lists in a multi-language environment.

SUMMARY OF THE INVENTION

The present invention is directed at providing a user with a method and system for localizing hierarchical lists.

According to one aspect of the invention, a hierarchical list can be localized to change the values of each hierarchical level without changing the underlying structure of the list. This allows users to create many different representations for values displayed within the underlying list. For example, users may localize the list into multiple languages. In this way, German users can see their skills listed in German, while Spanish users can see their skills listed in Spanish, and so on.

According to another aspect of the invention, the list may be modified by end-users. The user may make modifications to the list themselves without having to request the vendor supplying the software to make the change.

BRIEF DESCRIPTION OF THE DRAWINGS

FIG. 3 shows a structure table and localized values table;

DETAILED DESCRIPTION OF THE PREFERRED EMBODIMENT

Generally, the present invention is directed at providing a user with a method and system for localizing hierarchical lists.

Illustrative Operating Environment

Figure 1:
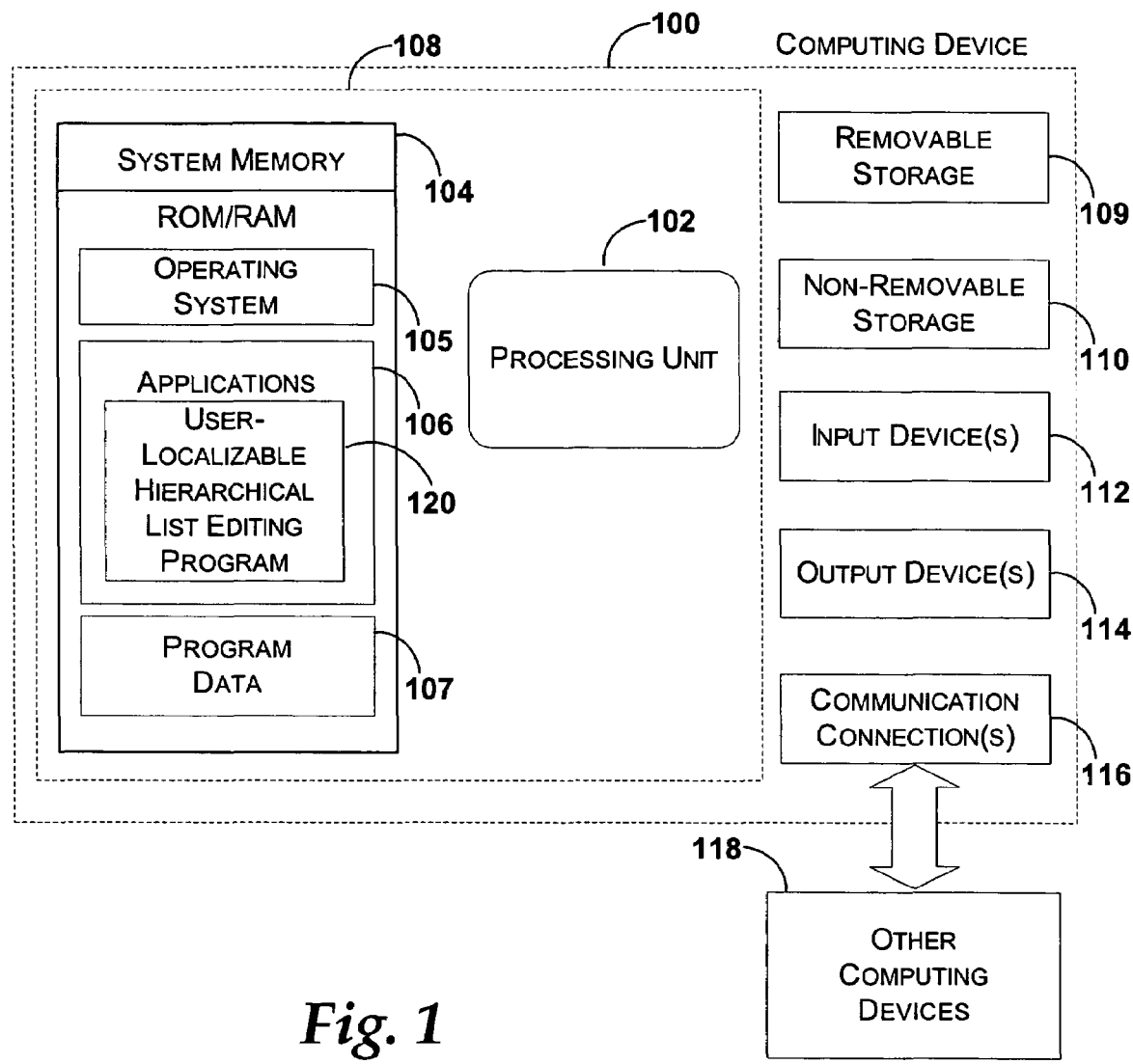
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a user-localizable hierarchical list editing program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

User-Localizable Hierarchical Lists

Figure 2:
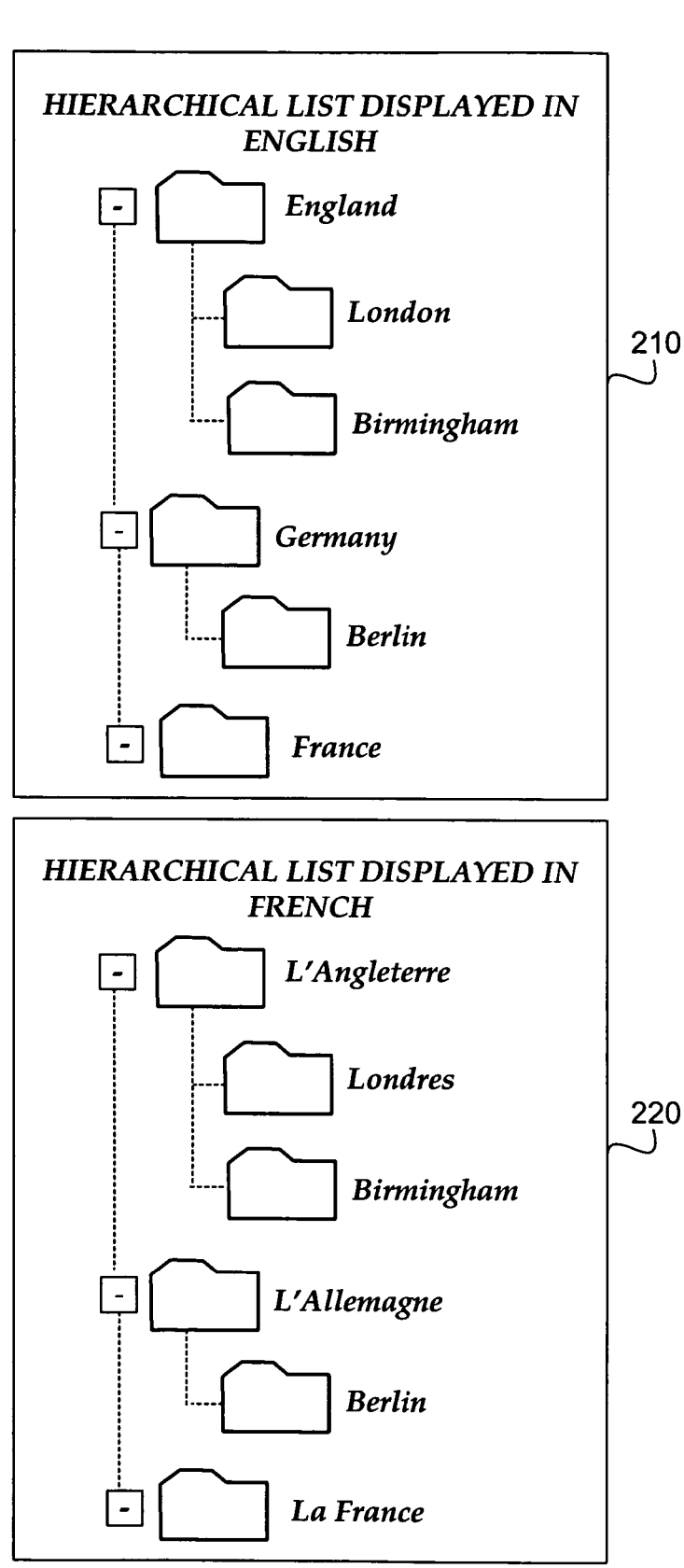
FIG. 2 illustrates localized displays of a hierarchical list.

FIG. 2 illustrates localized displays of a hierarchical list 200, in accordance with aspects of the present invention.

Display box 210 shows a hierarchical list that has been localized to English. Display box 220 shows the same hierarchical list that has been localized to French.

The underlying structure for the hierarchical list is the same for each localized display. The structure of the hierarchical list illustrated includes three countries at the top level of the list and three cities with parents. England, Germany, and France are at the top level of the list. London and Birmingham are children of England and Berlin is a child of Germany. While only two localizations of the list are shown, many other localizations may be created by a user. For example, the user could localize the list to more languages, such as Italian and Spanish.

FIG. 3 shows a structure table and localized values table 300, in accordance with aspects of the present invention.

Structure table 310 defines the relationship between the members of the list. In this example, structure table 310 represents the underlying hierarchical structure corresponding to the hierarchical list displayed in FIG. 2. The structure table includes a UID (unique identifier) column and a parent UID column.

Each member of the hierarchical list is assigned a UID. Referring to FIG. 2 there are six unique members, including: England, London, Birmingham, Germany, Berlin, and France. England is assigned UID=1 and has a NULL parent UID. A NULL parent UID corresponds to the top level of the hierarchy. London (UID=2) and Birmingham (UID=3) have a parent UID of 1 corresponding to each having England and a parent. Germany (UID=4) has a NULL parent UID. Berlin (UID=5) has a parent UID of 4 corresponding to having Germany as a parent. France (UID=6) has a NULL parent UID.

While the UIDs are shown as integers within structure table 310, any type of unique identifier may be used to represent the members as long as each member within the list is uniquely identified. According to one embodiment, the UID are Globally Unique IDentifiers (GUIDs) which have a form, such as: {D8E764C1-41EB-8838-A0238CEB35B0}.

Other methods of storing hierarchical data may be used. For example, instead of using the parent-child mechanism as described above, the order-level mechanism could be used. For example, the following table could be used to represent the hierarchical structure as shown in FIG. 2:

| UID | LEVEL | ORDER |
|-----|-------|-------|
| 1   | 1     | 1     |
| 2   | 2     | 2     |
| 3   | 2     | 3     |
| 4   | 1     | 4     |
| 5   | 2     | 5     |
| 6   | 1     | 6     |

Additionally, the structure could be represented using XML or other string-based formats. For example:

```
<1>
    <2/>
    <3/>
</1>
<4>
    <5/>
</4>
<6/>
```

The values associated with each of the members within the underlying hierarchical list are stored within user localized value table 320. Values table 320 includes a UID column, a value column, and a language ID (LCID) column. LCID column identifies the language for the value. The LCID may be any form so long as it identifies the language. According to one embodiment, the LCID is represented by a string. According to another embodiment, the LCID may be an integer. Some exemplary LCID strings are: "en" for English, "fr" for French, "en-us" for United States English, "en-uk" for British English, and "en-marketing" for English spoken by marketing people In this example, the user has localized the list to English and French and includes English values for each of the members and French values for each of the members. The rows having language values equal to "en" are the English values and the rows having language values equal to "fr" are the French values. A user could add more localizations to table 320.

When a list is being displayed, the local language may be determined from the computer system, some other source, or calculated based on some information about the user and then the display program may access the appropriate values within the localization table to display. For example, when the list is being displayed in an English speaking region, list 210 in FIG. 2 may be displayed by accessing the language values within table 320 that equal "en". Similarly, when the list is being displayed in a French speaking region, list 220 in FIG. 2 may be displayed by accessing the values that equal the language value of "fr".

The following table includes a limited number of exemplary LCIDs in string format.

| Language | LCID |
|----------|------|
| Chinese (Simplified) | zh-cn |
| Chinese (Traditional) | zh-tw |
| Czech | cs |
| Danish | da |
| Dutch (Nederlands) | nl |
| English (UK) | en-gb |
| English (US) | en-us |
| Finnish | fi |
| French | fr |
| German | de |
| Greek | el |
| Hungarian | hu |
| Italian | it |
| Japanese | ja |
| Korean | ko |
| Norwegian | no |
| Polish | pl |
| Portuguese | pt |
| Russian | ru |
| Spanish | es |
| Swedish | sv |

The following table includes a limited number of exemplary LCIDs in integer format. This list may include many more LCIDs.

| Language | LCID |
|----------|------|
| Arabic | 1025 (&H401) |
| Chinese Hong Kong SAR | 3076 (&HC04) |
| Chinese Traditional | 1028 (&H404) |
| Croatian | 1050 (&H41A) |
| Czech | 1029 (&H405) |
| Danish | 1030 (&H406) |
| Dutch | 1043 (&H413) |
| English U.K. | 2057 (&H809) |
| English U.S. | 1033 (&H409) |
| Farsi | 1065 (&H429) |
| Finnish | 1035 (&H40B) |
| French | 1036 (&H40C) |
| French Senegal | 10252 (&H280C) |
| German | 1031 (&H407) |
| Greek | 1032 (&H408) |
| Italian | 1040 (&H410) |
| Japanese | 1041 (&H411) |
| Korean | 1042 (&H412) |
| Lao | 1108 (&H454) |
| Portuguese | 2070 (&H816) |
| Romanian | 1048 (&H418) |
| Russian | 1049 (&H419) |
| Spanish (Traditional) | 1034 (&H40A) |

-continued

| Language | LCID |
|---|---|
| Spanish Chile | 13322 (&H340A) |
| Swedish | 1053 (&H41D) |
| Vietnamese | 1066 (&H42A) |

By adjusting the language ID on the user's system, the list will be displayed for that region as long as the list has been localized to their region. When a list has not been localized for a particular region, a default list may be selected. Partial localization of lists is also supported. For example, if only a proper subset of the entries in the list have localized values provided in the user's language, then for those without values in the user's language, values from the default language are substituted.

The language ID may also be used to display the list according to the specified language. For example, U.S. users may use the following format: Americas->USA.Seattle; whereas French users may display the same information as Amerique;EtasUnis,Seattle. For each language and each level, the separator can be different, as specified by the user.

Figure 4:
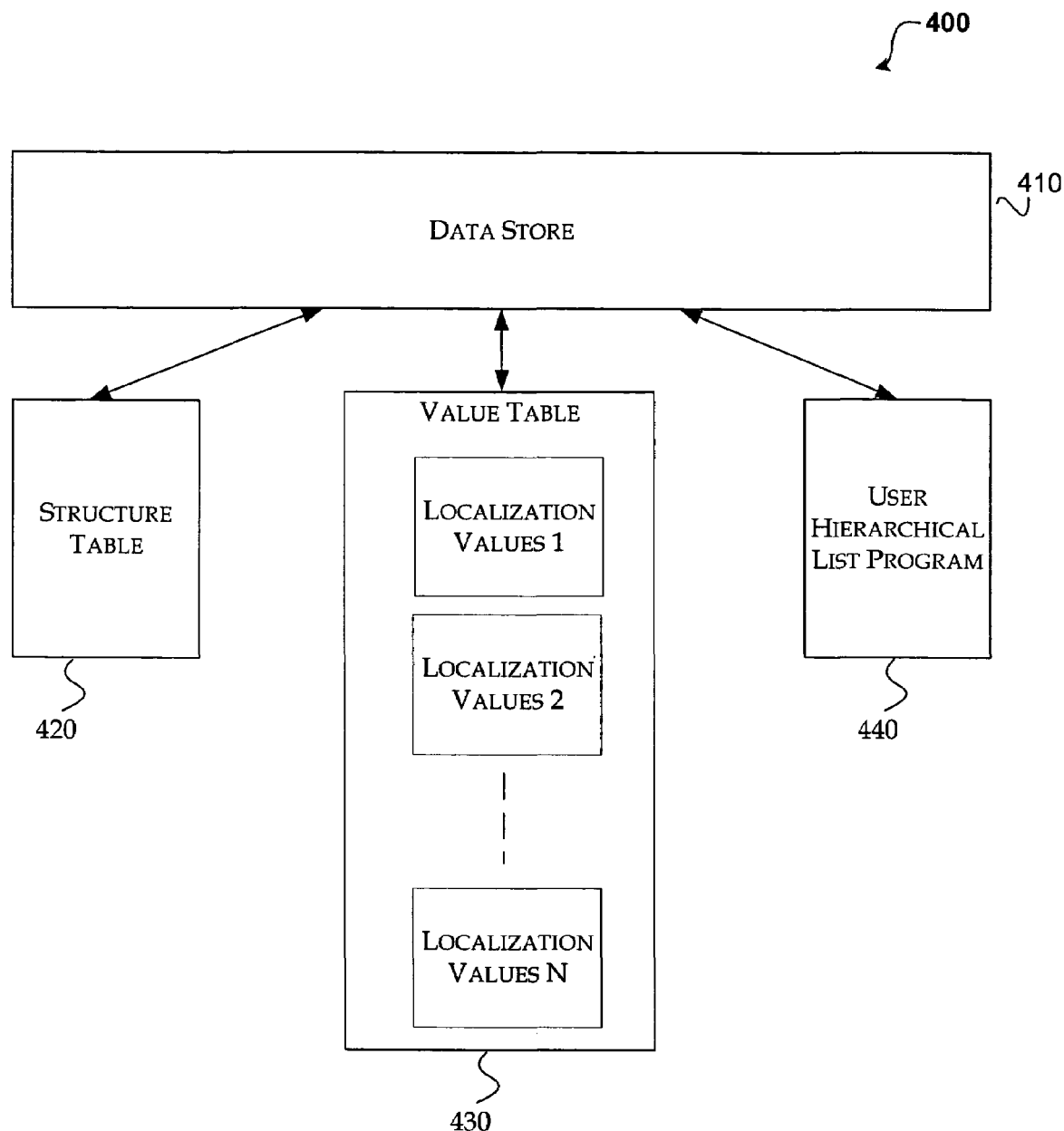
FIG. 4 is a functional block diagram generally illustrating a user-localizable list system.

FIG. 4 is a functional block diagram generally illustrating a user-localizable list system, in accordance with aspects of the invention. As illustrated, system 400 includes data store 410, structure table 420, value table 430, and user hierarchical list program 440.

Structure table 420 is configured to store the structure of the hierarchical list (See FIGS. 2 and 3 and related discussion). The structure of the hierarchical list stored within the structure table does not change based on each of the localizations.

Value table 430 includes N number of localizations. The user may create as many, or as few, localizations for the hierarchical list as they desire. For example, the table 430 may include 1, 2, 5, 10, or 80 different localizations.

According to one embodiment of the invention, the structure table and value table are stored within a SQL database in data store 410. The information contained within the tables, however, may be stored in many different ways. For example, the information may be stored in lists or other databases or in memory.

According to one embodiment, user hierarchical list program 440 allows the user to localize the values for hierarchical lists and perform other operations on the list such as: searching, sorting, and displaying operations on the list.

According to one embodiment, the UID for each member of the list is stored along with the value. Therefore, the user may search the list using the UID. This may help a user manage a large list. For example, suppose a hierarchical list represents different skills and the user is only interested in skill #12, then the user may search for skill #12 and only the portion of the list matching skill #12 will be returned to the user. When dealing with large tables this may save the user considerable time. Additionally, since the list is localized, when the list is returned to the user it will be displayed according to the user's localization value.

Figure 5:
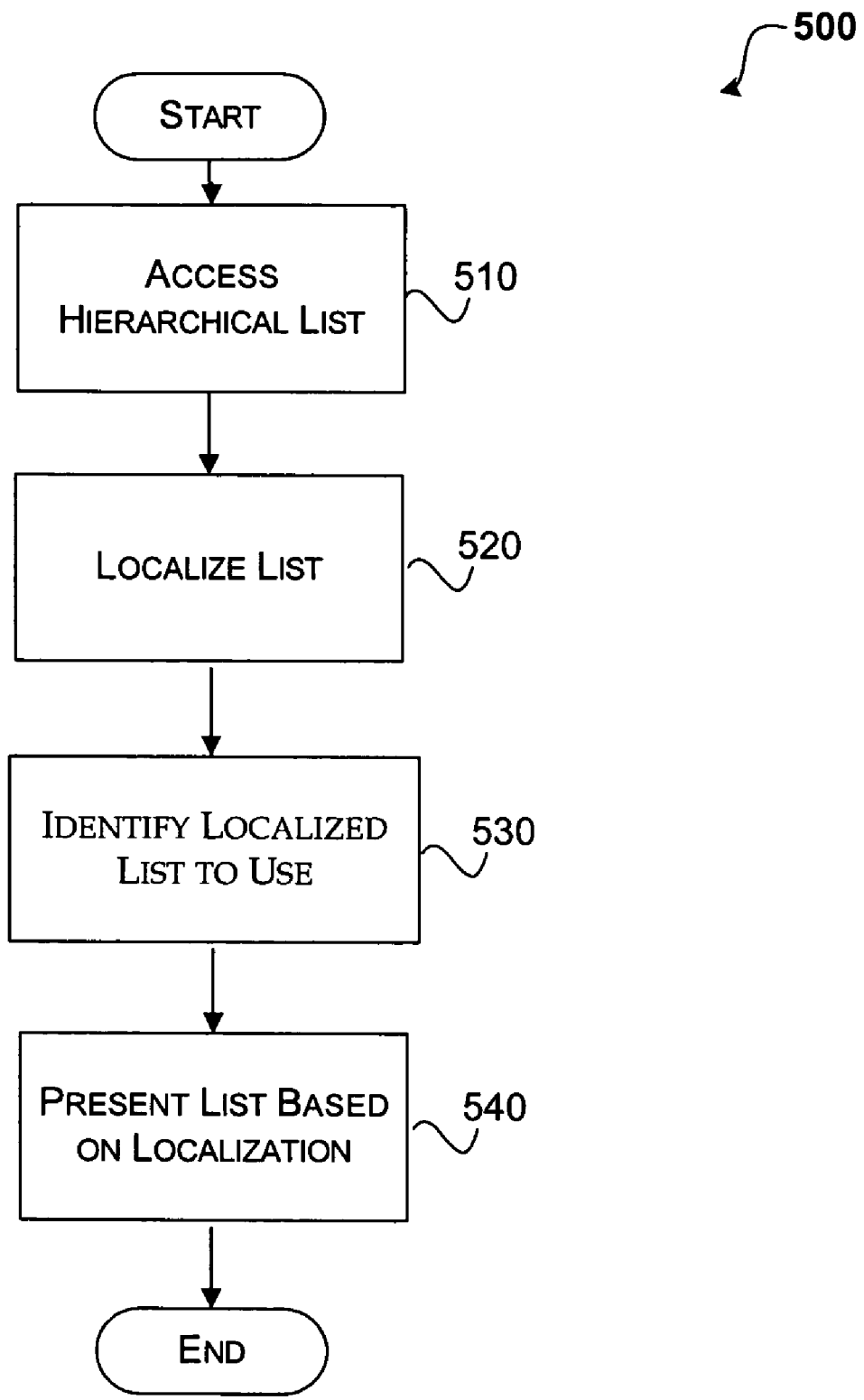
FIG. 5 illustrates a process flow for interacting with a user-localizable hierarchical list, in accordance with aspects of the invention.

FIG. 5 illustrates a process flow 500 for interacting with a user-localizable hierarchical list, in accordance with aspects of the invention After a start block the process flows to block 510 where the user accesses a hierarchical list.

Moving to block 520 the list is localized by the user. The user may localize the values within the list to meet their needs. For example, a user may localize the list to conform to German values for its German users, Italian for its Italian users and English for its English users.

Flowing to block 530, the localized list to use for a particular user is identified. According to one embodiment, the localized list is identified by a localization value, such as a language ID variable. The list may be identified in other ways. For example, the localized list may be selected based on a regional setting on the computer.

Transitioning to block 540, the list is presented to the user based on the user's localization value. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interacting with a user-localizable hierarchical list, comprising:

creating a structure representing the relationships between members of the hierarchical list;

associating values with the members of the list; wherein each value is a string in a first language; and wherein the values are displayed when the first language is selected for display and the hierarchical list is displayed;

assigning a unique identifier to each member of the hierarchical list; wherein each of the unique identifiers corresponds to a level in the hierarchical list;

indicating a parent for each member in the hierarchical list at a level other than a top level of the hierarchical list using one of the assigned unique identifiers;

including a localization of the values, wherein an end user sets localized values for at least some members of the hierarchical list to a localized language; wherein the localized values for the hierarchical list include associating each localized value with one of the unique identifiers and associating the localized value with the localized language; wherein the localization that is created by the end-user is created after the hierarchical list is displayed within an application and presented to a user using the first language;

storing the values in a localized values table, the localized values table comprising a unique identifier column, a value column and a language identifier column; wherein the localized values table maintains at least one row with an identifier of a member, a value associated with the member, and an identification of the localized language; and in response to selection of a localized language identifier by a user, generating a display of a list comprising values represented by a plurality of languages, the generation of the display including:

determining whether a localized value associated with the localized language identifier exists for each member of the list; and in response to determining a member is associated with a localized value associated with the localized language identifier:

displaying the localized value associated with the member;

in response to determining the member is not associated with a localized value associated with the localized language identifier:

displaying a value in the first language, the value associated with the member of the list.

2. The method of claim 1, further comprising: presenting an editing program for an end-user to edit the values of the hierarchical list to create a localization of the list into another language such that when a language associated with the localization is selected, the values edited by the end-user are displayed.

3. The method of claim 1, wherein the editing program is configured to allow the end-user to search for one or more values within the list; sort the list and display the list.

4. The method of claim 3, further comprising storing the structure separately from the values.

5. The method of claim 4, further comprising associating a localization value with each localization.

6. The method of claim 5, further comprising:
determining the localization value that is associated with a user and displaying the values that correspond to the user's localization value.

7. A computer-readable storage medium having computer-executable instructions for performing steps involving a user-localizable hierarchical list, comprising:
creating a structure representing the relationships between members of the hierarchical list;
associating values with the members of the list; wherein each value is a string in a first language; and wherein the values are displayed when the first language is selected for display and the hierarchical list is displayed;
assigning a unique identifier to each member of the hierarchical list; wherein each of the unique identifiers corresponds to a level in the hierarchical list;
indicating a parent for each member in the hierarchical list at a level other than a top level of the hierarchical list using one of the assigned unique identifiers;
including a localization of the values, wherein an end user sets localized values for at least some members of the hierarchical list to a localized language; wherein the localized values for the hierarchical list include associating each localized value with one of the unique identifiers and associating the localized value with the localized language; wherein the localization that is created by the end-user is created after the hierarchical list is displayed within an application and presented to a user using the first language;
storing the values in a localized values table, the localized values table comprising a unique identifier column, a value column and a language identifier column; wherein the localized values table maintains at least one row with an identifier of a member, a value associated with the member, and an identification of the localized language; and
in response to selection of a localized language identifier by a user, generating a display of a list comprising values represented by a plurality of languages, the generation of the display including:
determining whether a localized value associated with the localized language identifier exists for each member of the list; and
in response to determining a member is associated with a localized value associated with the localized language identifier:
displaying the localized value associated with the member;
in response to determining the member is not associated with a localized value associated with the localized language identifier:
displaying a value in the first language, the value associated with the member of the list.

8. The computer-readable storage medium of claim 7, wherein the hierarchical list is represented as a structure including a column of unique identifiers and a column of parent identifiers.

9. The computer-readable storage medium of claim 7 further comprising: presenting an editing program for an end-user to edit the values of the hierarchical list to create a localization of the list into another language such that when a language associated with the localization is selected, the values edited by the end-user are displayed.

10. The computer-readable storage medium of claim 9, wherein the members are stored separately from the localizations.

11. The computer-readable storage medium of claim 9, wherein each localization is associated with a language ID.

12. The computer-readable storage medium of claim 11, wherein the language ID is represented using at least one of the following: an integer; a string; and a GUID.

13. The computer-readable storage medium of claim 9, displaying the values that correspond to the user's localization value.

14. A system for providing a user-localizable hierarchical list, comprising:
a processor and a computer-readable medium;
an operating environment stored on the computer-readable medium and executing on the processor;
a hierarchical list stored on the computer-readable medium;
a display; and
an application operating under the control of the operating environment and configured to perform actions, including:
creating a structure representing the relationships between members of the hierarchical list;
associating values with the members of the list; wherein each value is a string in a first language; and wherein the values are displayed when the first language is selected for display and the hierarchical list is displayed;
assigning a unique identifier to each member of the hierarchical list; wherein
each of the unique identifiers corresponds to a level in the hierarchical list;
indicating a parent for each member in the hierarchical list at a level other than a top level of the hierarchical list using one of the assigned unique identifiers;
including a localization of the values, wherein an end user sets localized values for at least some members of the hierarchical list to a localized language;
wherein the localized values for the hierarchical list include associating each localized value with one of the unique identifiers and associating the localized value with the localized language; wherein the localization that is created by the end-user is created after the hierarchical list is displayed within an application and presented to a user using the first language;
storing the values in a localized values table, the localized values table comprising a unique identifier column, a value column and a language identifier column; wherein the localized values table maintains at least one row with an identifier of a member, a value associated with the member, and an identification of the localized language; and
in response to selection of a localized language identifier by a user, generating a display of a list comprising values represented by a plurality of languages, the generation of the display including:

determining whether a localized value associated with the localized language identifier exists for each member of the list; and in response to determining a member is associated with a localized value associated with the localized language identifier:

displaying the localized value associated with the member;

in response to determining the member is not associated with a localized value associated with the localized language identifier:

displaying a value in the first language, the value associated with the member of the list.

15. The system of claim 14, wherein the application is further configured to allow the user to create the localization.

16. The system of claim 14, wherein the editing program is configured to allow the end-user to search for one or more values within the list; sort the list and display the list.

17. The system of claim 14, further comprising storing the members separately from the localizations.

* * * * *